(12) United States Patent
Pan et al.

(10) Patent No.: US 9,419,525 B2
(45) Date of Patent: Aug. 16, 2016

(54) ISOLATED POWER CONVERSION APPARATUS AND METHOD OF CONVERTING POWER

(71) Applicant: HEP TECH CO., LTD., Taichung (TW)

(72) Inventors: Ching-Tsai Pan, Hsinchu (TW); Po-Yen Chen, Taipei (TW); Ta-Sheng Hung, Taichung (TW)

(73) Assignee: HEP TECH CO., LTD., Taichung (TW)

( * ) Notice: Subject to any disclaimer, the term of this patent is extended or adjusted under 35 U.S.C. 154(b) by 237 days.

(21) Appl. No.: 14/096,836

(22) Filed: Dec. 4, 2013

(65) Prior Publication Data
US 2014/0153296 A1 Jun. 5, 2014

(30) Foreign Application Priority Data
Dec. 5, 2012 (TW) .............................. 101145613 A

(51) Int. Cl.
*H02M 3/335* (2006.01)
*H02M 1/34* (2007.01)

(52) U.S. Cl.
CPC .......... *H02M 3/335* (2013.01); *H02M 3/33523* (2013.01); *H02M 2001/346* (2013.01)

(58) Field of Classification Search
CPC ............ H02M 3/33523; H02M 3/335; H02M 3/33553; H02M 3/285; H02M 2001/346; H02M 2001/342
See application file for complete search history.

(56) References Cited

U.S. PATENT DOCUMENTS

| | | | | |
|---|---|---|---|---|
| 5,278,748 A * | 1/1994 | Kitajima | ................. | H02M 1/34 363/21.02 |
| 5,736,842 A * | 4/1998 | Jovanovic | ............... | H02M 1/34 323/222 |
| 6,052,294 A * | 4/2000 | Jacobs | ..................... | H02M 1/34 363/126 |
| 6,069,472 A * | 5/2000 | Pernyeszi | ................ | H02M 7/48 323/282 |
| 6,434,029 B1 * | 8/2002 | Cyr | .......................... | H02M 1/34 323/222 |
| 2002/0136033 A1 * | 9/2002 | Hirokawa | ............... | H02M 1/34 363/21.01 |

* cited by examiner

*Primary Examiner* — Harry Behm
(74) *Attorney, Agent, or Firm* — Ming Chow; Sinorica, LLC

(57) ABSTRACT

An isolated power conversion apparatus includes an isolation transformer and an auto charge pump circuit. The isolation transformer has a primary side and a second side, wherein the primary side is electrically connected to a pulsed power supply, and the secondary side has a first end and a second end; the auto charge pump circuit electrically connects the isolation transformer to a loading to improve power conversion efficiency and suppress output voltage ripples.

11 Claims, 6 Drawing Sheets

ISOLATED POWER CONVERSION APPARATUS AND METHOD OF CONVERTING POWER

The current application claims a foreign priority to the patent application of Taiwan No. 101145613 filed on Dec. 5, 2012.

BACKGROUND OF THE INVENTION

1. Technical Field

The present invention relates generally to power conversion, and more particularly to an isolated power conversion apparatus and a method of converting power.

2. Description of Related Art

The most significant difference between isolated power transfer systems and typical power transfer systems is that the former transmit energy by an isolated transformer to transmit energy from a primary side to a secondary side through electromagnetic coupling rather than by wires. However, the power conversion efficiency of the isolated power transfer systems is lower than typical ones due to the limitation of coupling effect. Therefore, the conventional isolated power transfer systems are usually applied with resonant impedance matching to enhance the power conversion efficiency. But circuits with impedance matching tend to be affected by the coupling coefficient of corresponding transformers, and therefore fail to reach expected performance. Besides, only if an output voltage of a power transfer system is higher than a voltage of a connected loading to overcome an electric potential barrier of the output terminal, the loading can then be provided with energy; hence a transformer with larger turn ratio is needed in isolated power transferring circuits to increase voltage to required level. Unfortunately, the copper loss of transformers increases with higher turn ratio, which lowers the power conversion efficiency again.

BRIEF SUMMARY OF THE INVENTION

In view of the above, the primary objective of the present invention is to provide an isolated power conversion apparatus and a method of converting power, which provides a negative electric potential to compensate a voltage barrier of a connected loading, and the turn ratio of a transformer can then be decreased, which lowers copper loss. As a result, energy can be smoothly and effectively transmitted to the loading from a primary side of the transformer with higher power conversion efficiency.

The present invention provides an isolated power conversion apparatus for converting electric power of a pulsed power supply and transmitting the converted electric power to a loading, which includes an isolated transformer and an auto charge pump circuit, wherein the isolated transformer has a primary side and a secondary side, wherein the primary side is electrically connected to the pulsed power supply, and the secondary side has a first end and a second end; the auto charge pump circuit electrically connects the isolated transformer to the loading, and the auto charge pump circuit includes a first diode, a first capacitor, an inductor, and a second capacitor, wherein the first diode has an anode and a cathode, wherein the anode is connected to the second end of the secondary side of the isolated transformer, and the cathode is connected to the first end of the secondary side of the isolated transformer; the first capacitor has an end electrically connected to the first end of the secondary side and the cathode of the first diode; the inductor electrically connects another end of the first capacitor to the cathode of the first diode; the second capacitor is electrically connected to the loading in parallel, and has two ends, wherein one end is electrically connected to the first capacitor and the inductor, and the other end is electrically connected to the anode of the first diode and the second end of the secondary side of the isolated transformer.

According to the aforementioned concepts, the present invention further provides a method of converting power, which includes the steps of:

A. Charge an isolated transformer at a primary side thereof with electric power provided by a pulsed power supply, and provide energy to a loading from an inductor, a first capacitor, and a second capacitor which are connected in parallel;

B. Charge the inductor, the first capacitor, and the second capacitor by a secondary side of the isolated transformer to keep providing energy to the loading from the second capacitor when the pulsed power supply stops providing the electric power;

C. Conduct a diode to make the first capacitor and the inductor generate a reverse voltage, and to charge the second capacitor for keeping providing energy to the loading.

With such design, it may provide negative electric potential to compensate the voltage barrier of the connected loading while converting power, and the turn ratio of the transformer can be decreased, which lowers copper loss. As a result, energy can be smoothly and effectively transmitted to the loading from the primary side of the transformer, and the power conversion efficiency can be further enhanced.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
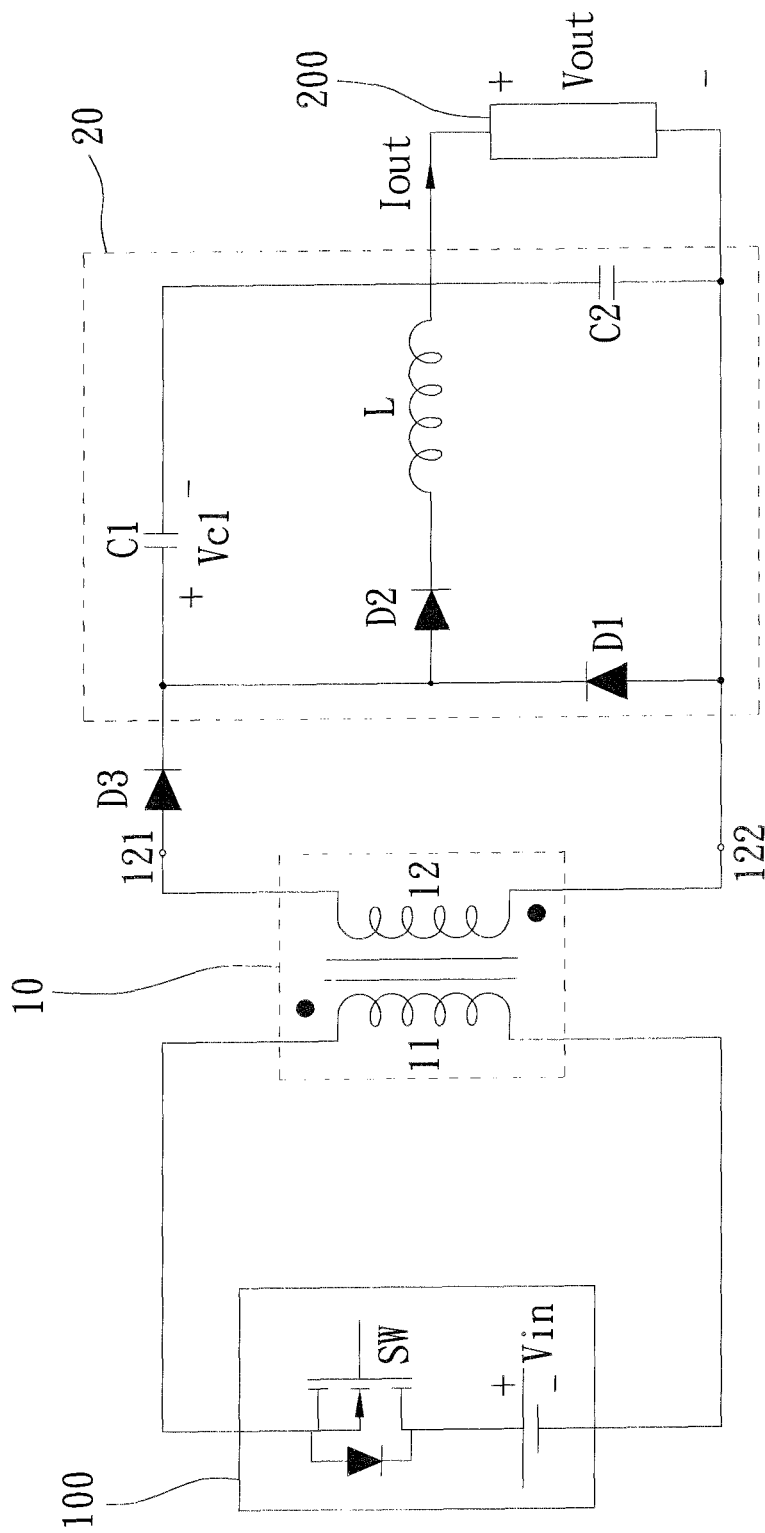
FIG. 1 is a circuit diagram of a preferred embodiment of the present invention.

As shown in FIG. 1, an isolated power conversion apparatus of the preferred embodiment of the present invention is used to convert an electric power from a pulsed power supply 100 and transmit it to a loading 200, wherein the pulsed power supply 100 includes a power source $V_{in}$ and a switch SW. The isolated power conversion apparatus includes an isolated transformer 10 and an auto charge pump circuit 20.

The isolated transformer 10 is a noncontact transformer in the present preferred embodiment, having a primary side 11 and a secondary side 12 which are set independently. The primary side 11 is electrically connected to the pulsed power supply 100, and the secondary side 12 has a first end 121 and a second end 122. Of course, in other embodiments, the isolated transformer 10 could be an auto transformer.

The auto charge pump circuit 20 electrically connects the isolated transformer 10 and the loading 200. The auto charge pump circuit 20 includes a first diode D1, a second diode D2, a first capacitor C1, a second capacitor C2, and an inductor L. The first diode D1 has an anode electrically connected to the second end 122 of the secondary side 12, and a cathode electrically connected to the first end 121 of the secondary side 12. The first capacitor C1 is a non-polarity capacitor, which has two ends, and one of which is electrically connected to the first end 121 of the secondary side 12 and the cathode of the first diode D1. The second diode D2 has an anode electrically connected to the first capacitor C1. The inductor L has two ends, one of which is electrically connected to the other end of the first capacitor C1, and the other of which is connected to the cathode of the second diode D2. The second capacitor C2 is a non-polarity capacitor connected to the loading 200 in parallel. The second capacitor C2 has two ends, one of which is electrically connected to the first capacitor C1 and the inductor L, and the other of which is electrically connected to the anode of the first diode D1 and the second end 122 of the secondary side 12.

In addition, in order to prevent the isolated transformer 10 from being affected by backflow, the isolated transformer 10 further includes a third diode D3 set on the first end 121 of the secondary side 12. The third diode D3 has an anode electrically connected to the first end 121 of the secondary side 12, and a cathode electrically connected to the cathode of the first diode D1, the anode of the second diode D2, and the first capacitor C1.

Table 1 shows the specs of the capacitors C1 and C2, the inductor L, an input voltage of the power source $V_{in}$, an output voltage $V_{out}$ flows through the loading 200, a turn ratio of the isolated transformer 10, and a resistance of the loading 200:

TABLE 1

| | |
|---|---|
| Inductor L1 | 100 μH |
| First capacitor C1 | 0.1 μF |
| Second capacitor C2 | 10 nF |
| Input voltage of the power source $V_{in}$ | 110 V |
| Output voltage $V_{out}$ | 5 V |
| Turn ratio | 100:8 |
| Resistance of the loading | 5 Ω |

Figure 2:
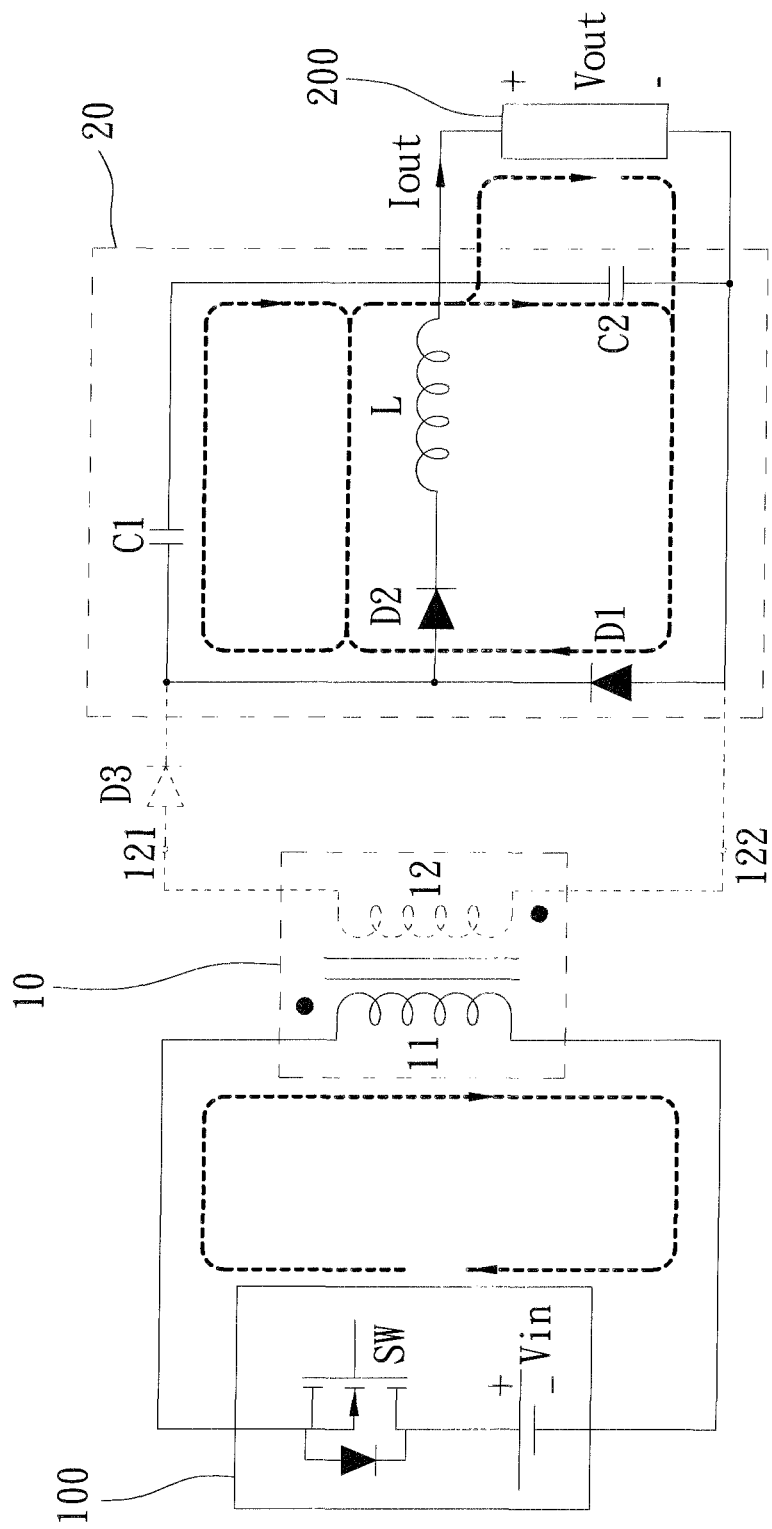
FIG. 2 to FIG. 4 are circuit diagrams of the preferred embodiment of the present invention, showing how the isolated power conversion apparatus works in different steps.

With the aforementioned design and specifications, the isolated power conversion apparatus may perform a method to convert power, which effectively enhances the power conversion efficiency, wherein the method includes the following steps:

A. As shown in FIG. 2, conduct the switch SW to let the power source $V_{in}$ provide electric power 10 to charge the primary side 11 of the isolated transformer 10, and at the same time, the inductor L, the first capacitor C1, and the second capacitor C2 are providing energy to the loading 200.

Figure 3:
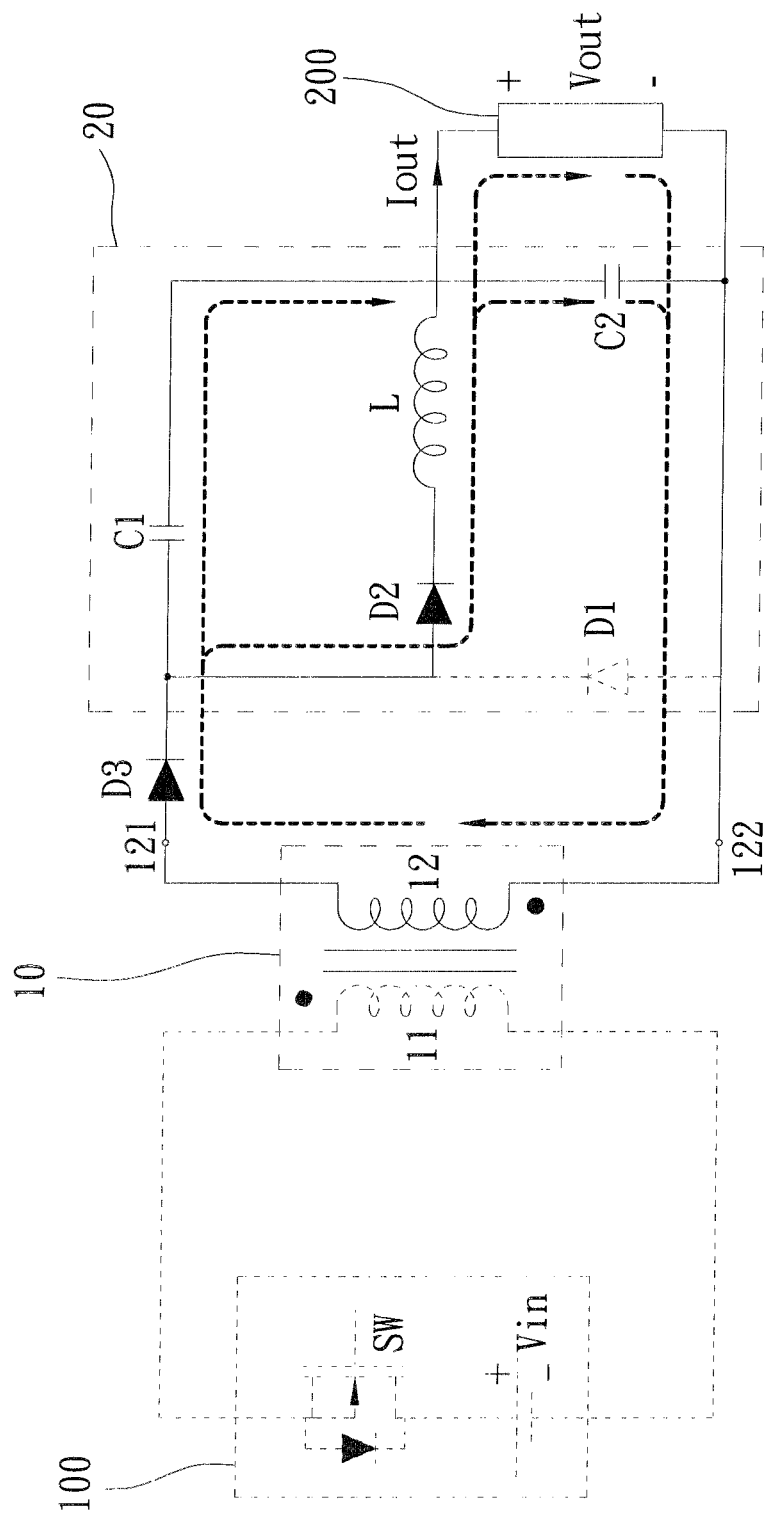

B. As shown in FIG. 3, cut off the switch SW to stop the electric power of the power source $V_{in}$ of the pulsed power supply 100. After that, the secondary side 12 of the isolated transformer 10 charges the inductor L and the first capacitor C1 to store energy in the first capacitor C1, and then the energy of the first capacitor C1 is transmitted from the secondary side 12 to the second capacitor C2 through a resonant circuit formed by the first capacitor C1 and the inductor L to keep providing energy from the second capacitor C2 to the loading 200.

Figure 4:
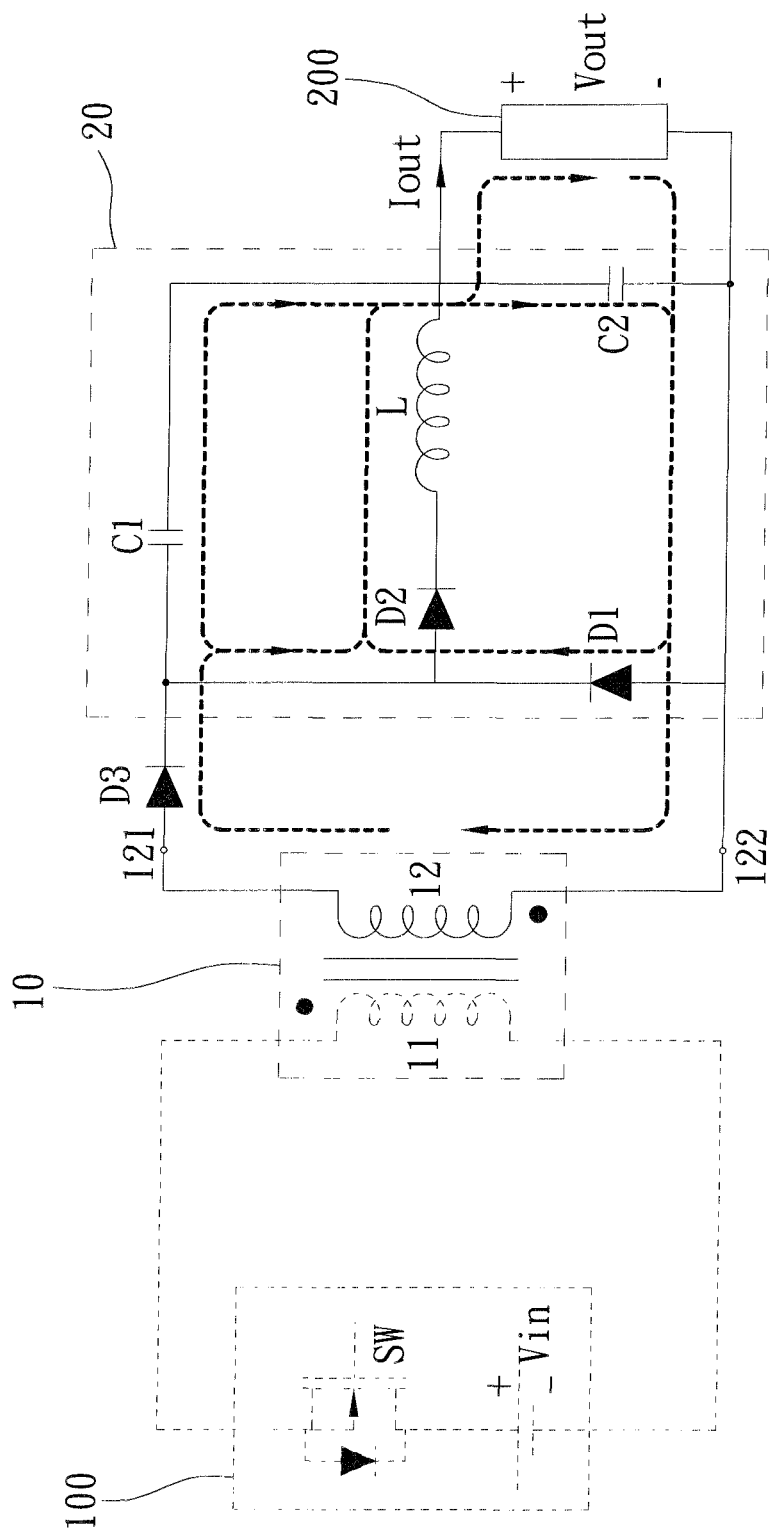

C. As shown in FIG. 4, once the first capacitor C1 and the inductor L are resonating, a polarity of a voltage drop of the first capacitor C1 gets reversed, which conducts the first diode D1 to let the first capacitor C1 and the inductor L generate a reverse voltage, and to charge the second capacitor C2 to keep providing energy to the loading 200.

Every time the method executes from the step A to the step C, it is defined as one cycle. Therefore, while isolated power conversion apparatus is working, the step A to the step C are proceeded repeatedly until the isolated power conversion apparatus stops working.

Figure 5:
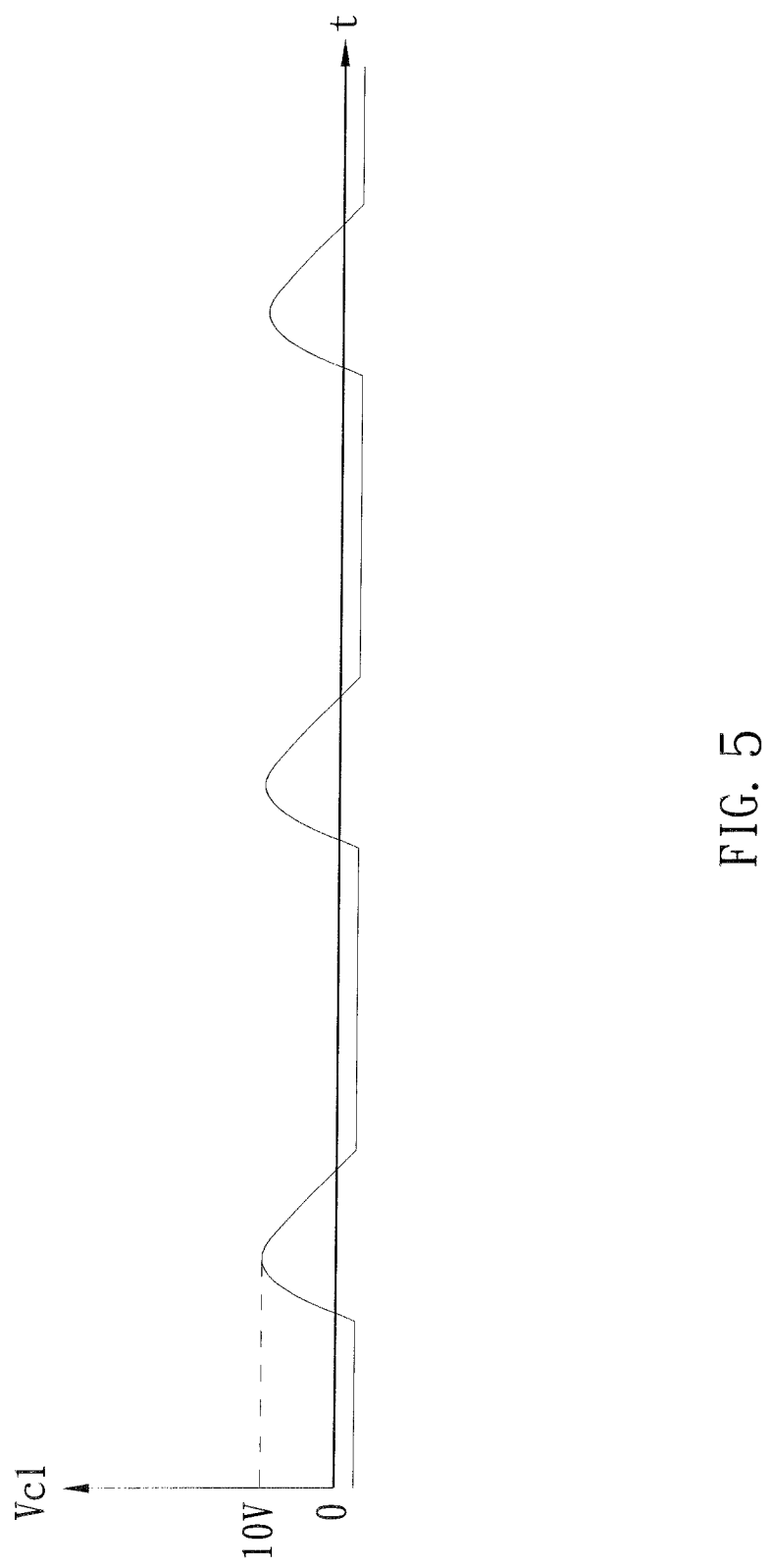
FIG. 5 is an oscillogram of the voltage of the first capacitor.

As shown in FIG. 5, through the aforementioned design of the auto charge pump circuit 20, the voltage drop Vc1 of the first capacitor C1 provides a negative electric potential automatically in each cycle, which conducts the first diode D1. Therefore, the whole circuit is different after the first diode D1 being conducted, and a barrier generated by a voltage of the loading 100 is compensated with the negative electric potential. In this way, the turn ratio of the isolated transformer 10 could be lowered, and the copper loss is lowered as well. Furthermore, the energy at the primary side 11 of the isolated transformer 10 could be transmitted to the loading 200 more smoothly and effectively, and hence the power conversion efficiency is further enhanced.

Figure 6:
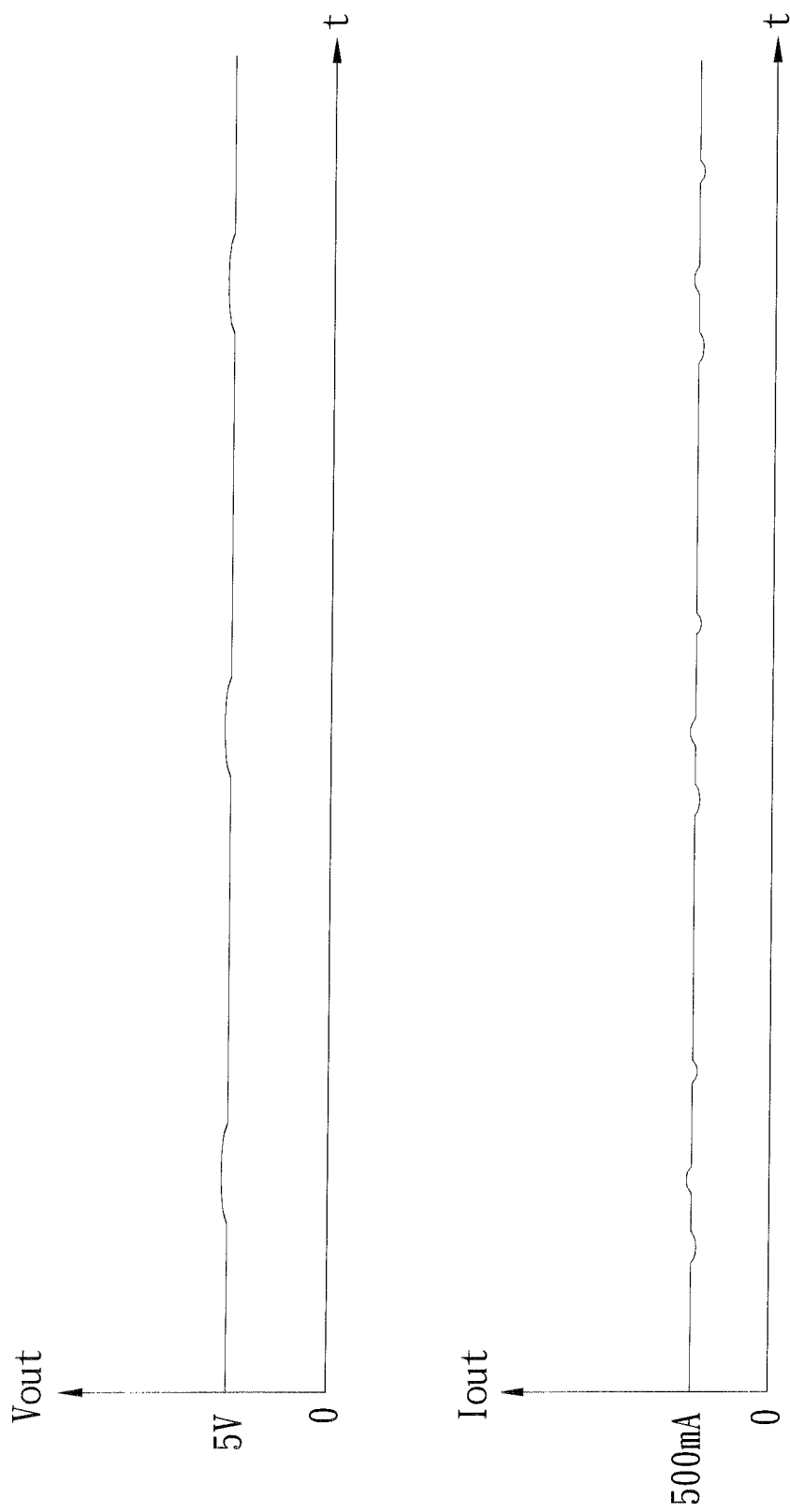
FIG. 6 is an oscillogram of the output voltage and the output current.

In addition, as shown in FIG. 6, under the condition that an output voltage of the isolated power conversion apparatus is 5V in the present preferred embodiment, an output voltage ripple is merely about 0.2V, which is around 4% of the output voltage. In other words, the isolated power conversion apparatus of the present preferred embodiment could lower the output voltage ripple as well, and therefore the second capacitor C2 could be any type of capacitors other than electrolytic capacitor which has shorter life, and life of the isolated power conversion apparatus is further prolonged.

Moreover, the second diode D2 could prevent a backflow to the loading 200, which further stabilizes the whole circuit, and the isolated power conversion apparatus could perform better in converting power and suppressing ripples. Of course, the purpose to suppress ripples could be achieved even without the second diode D2 in practice.

In addition, the auto charge pump circuit 20 of the present invention could not only be applied as a circuit structure to receive electric power generated by any transformers, but also suitable for receiving electric power from other pulsed power supplies. It must be pointed out that the embodiments described above are only some preferred embodiments of the present invention. All equivalent structures and methods which employ the concepts disclosed in this specification and the appended claims should fall within the scope of the present invention.

What is claimed is:

1. An isolated power conversion apparatus for converting electric power of a pulsed power supply and transmitting the converted electric power to a loading, comprising:
   an isolated transformer having a primary side and a secondary side, wherein the primary side is electrically connected to the pulsed power supply, and the secondary side has and only has a first end and a second end; and
   an auto charge pump circuit electrically connecting the isolated transformer to the loading, comprising:
      a first diode having an anode and a cathode, wherein the anode is connected to the second end of the secondary side of the isolated transformer, and the cathode is connected to the first end of the secondary side of the isolated transformer;
      a first capacitor having an end electrically connected to the cathode of the first diode;
      an inductor electrically connecting another end of the first capacitor to the cathode of the first diode, wherein the another end of the first capacitor is connected to the loading directly; and
      a second capacitor, which is electrically connected to the loading in parallel, having two ends, one of which is electrically connected to the first capacitor and the inductor, and the other of which is electrically connected to the anode of the first diode and the second end of the secondary side of the isolated transformer;

wherein the second capacitor is connected to the another end of the first capacitor directly, and the second capacitor is connected to the anode of the first diode and the second end of the secondary side directly;

wherein the cathode of the first diode is connected to the first capacitor directly;

wherein the isolated power conversion apparatus further comprises a third diode, which is set at the first end of the secondary side of the isolated transformer, having an anode and a cathode, wherein the cathode of the third diode is connected to the cathode of the first diode and the first capacitor, and the anode thereof is connected to the secondary side;

wherein the cathode of the third diode is connected to the cathode of the first diode and the first capacitor directly, and the anode of the third diode is connected to the first end of the secondary side directly.

2. The isolated power conversion apparatus of claim 1, further comprising a second diode having an anode and a cathode, wherein the anode of the second diode is connected to the cathode of the first diode, and the cathode thereof is connected to the inductor.

3. The isolated power conversion apparatus of claim 1, wherein the first capacitor is a non-polarity capacitor.

4. The isolated power conversion apparatus of claim 1, wherein the second capacitor is a non-polarity capacitor.

5. The auto charge pump circuit of claim 1, further comprising a second diode having an anode and a cathode, wherein the anode of the second diode is connected to the cathode of the first diode, and the cathode thereof is connected to the inductor.

6. A method of converting power with the isolated power conversion apparatus of claim 1, comprising the steps of:
  A. charging the isolated transformer at the primary side thereof with electric power provided by the pulsed power supply, and providing energy to the loading from the inductor, the first capacitor, and the second capacitor which are connected in parallel;
  B. charging the inductor, the first capacitor, and the second capacitor by the secondary side of the isolated transformer to keep providing energy to the loading from the second capacitor when the pulsed power supply stops providing the electric power;
  C. conducting the first diode and the third diode to make the first capacitor and the inductor generate a reverse voltage, and to charge the second capacitor for keeping providing energy to the loading.

7. The method of claim 6, further comprising the step of repeating the steps from the step A to the step C after the step C.

8. The method of claim 6, wherein the secondary side of the isolated transformer transmits stored energy thereof to the second capacitor through a resonant circuit formed by the first capacitor and the inductor in the step B.

9. The method of claim 8, wherein once the resonant circuit is formed, a voltage drop of the first capacitor reverses to conduct the first diode and the third diode.

10. The method of claim 8, wherein the pulsed power supply has a switch; the pulsed power supply provides the electric power when the switch is on, and stops providing the electric power when the switch is off.

11. An auto charge pump circuit for receiving electric power from a pulsed power supply and providing energy to a loading, wherein the pulsed power supply has a first output and a second output; the auto charge pump circuit comprising:
  a first diode having an anode and a cathode, wherein the anode is electrically connected to the second output of the pulsed power supply, and the cathode is electrically connected to the first output of the pulsed power supply;
  a first capacitor having two ends, one of which is electrically connected to the first output of the pulsed power supply and the cathode of the first diode;
  an inductor electrically connecting the other end of the first capacitor to the cathode of the first diode, wherein the other end of the first capacitor is connected to the loading directly; and
  a second capacitor, which is connected to the loading in parallel, having two ends, one of which is electrically connected to the first capacitor and the inductor, and the other of which is electrically connected to the anode of the first diode and the second output of the pulsed power supply;
  wherein the second capacitor is connected to the other end of the first capacitor directly, and the second capacitor is connected to the anode of the first diode and the second output of the pulsed power supply directly;
  wherein the cathode of the first diode is connected to the first capacitor directly;
  wherein the auto charge pump further comprises a third diode, which has an anode and a cathode, wherein the cathode of the third diode is connected to the cathode of the first diode and the first capacitor directly, and the anode thereof is connected to the second output of the pulsed power supply directly.

* * * * *